(12) United States Patent
Ikuta et al.

(10) Patent No.: US 10,511,502 B2
(45) Date of Patent: Dec. 17, 2019

(54) INFORMATION PROCESSING METHOD, DEVICE AND RECORDING MEDIUM FOR COLLECTING LOGS AT OCCURRENCE OF AN ERROR

(71) Applicant: FUJITSU LIMITED, Kawasaki-shi, Kanagawa (JP)

(72) Inventors: Yuya Ikuta, Machida (JP); Hideki Nagatomo, Yokohama (JP); Hiroshi Otsuka, Munich (DE); Tooru Kobayashi, Kawasaki (JP); Hiroshi Shiomi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 169 days.

(21) Appl. No.: 15/614,798

(22) Filed: Jun. 6, 2017

(65) Prior Publication Data
US 2017/0366424 A1 Dec. 21, 2017

(30) Foreign Application Priority Data

Jun. 15, 2016 (JP) .................................. 2016-119347

(51) Int. Cl.
*H04L 12/26* (2006.01)
*H04L 29/06* (2006.01)

(52) U.S. Cl.
CPC .......... *H04L 43/065* (2013.01); *H04L 43/067* (2013.01); *H04L 43/0829* (2013.01); *H04L 43/0847* (2013.01); *H04L 69/22* (2013.01)

(58) Field of Classification Search
CPC ........ H04L 43/06; H04L 43/065; H04L 12/24
(Continued)

(56) References Cited

U.S. PATENT DOCUMENTS 5,862,316 A * 1/1999 Hagersten ........... G06F 11/2205
   707/999.201
7,424,653 B2 * 9/2008 Adkisson ............ G06F 11/0775
   714/723

(Continued)

FOREIGN PATENT DOCUMENTS

JP          9-55797      2/1997
JP          10-133917    5/1998
(Continued)

*Primary Examiner* — Kamini B Patel
(74) *Attorney, Agent, or Firm* — Xsensus LLP

(57) ABSTRACT

An information processing method executed by a processor included in an information processing device includes acquiring, when an error occurred at the information processing device is detected, first identification information that include identification information of a transmission source of a first packet transmitted or received when the error has occurred and identification information of a transmission destination of the first packet; receiving a second packet; determining whether second identification information included in the second packet matches with the first identification information, the second identification information including identification information of a transmission source of the second packet and identification information of a transmission destination of the second packet; storing data corresponding to the second packet when it is determined that the second identification information matches with the first identification information; and transmitting the data to a management device that analyzes the error when an instruction is received from the management device.

11 Claims, 15 Drawing Sheets

(58) Field of Classification Search
USPC .......................................................... 714/20
See application file for complete search history.

(56) References Cited

U.S. PATENT DOCUMENTS

| | | | | |
|---|---|---|---|---|
| 8,542,756 | B2* | 9/2013 | Dateki | H04L 1/0061 |
| | | | | 375/259 |
| 2005/0149829 | A1* | 7/2005 | Lee | H04L 1/0045 |
| | | | | 714/776 |
| 2007/0190998 | A1* | 8/2007 | Tanaka | H04L 67/2823 |
| | | | | 455/423 |
| 2007/0255819 | A1* | 11/2007 | Hua | H04L 45/00 |
| | | | | 709/224 |
| 2011/0145421 | A1* | 6/2011 | Yao | H04W 76/14 |
| | | | | 709/228 |
| 2017/0078222 | A1* | 3/2017 | Yamashita | H04L 43/16 |

FOREIGN PATENT DOCUMENTS

| | | |
|---|---|---|
| JP | 2010-192665 | 9/2010 |
| JP | 2013-206147 | 10/2013 |

\* cited by examiner

FIG. 5

| SID | DID |
|---|---|
| aaaa | bbbb |

FIG. 7

| ... | aaaa | bbbb | ... |
|---|---|---|---|
| ... | aaaa | bbbb | ... |
| ... | aaaa | bbbb | ... |

⋮

INFORMATION PROCESSING METHOD, DEVICE AND RECORDING MEDIUM FOR COLLECTING LOGS AT OCCURRENCE OF AN ERROR

CROSS-REFERENCE TO RELATED APPLICATION

This application is based upon and claims the benefit of priority of the prior Japanese Patent Application No. 2016-119347, filed on Jun. 15, 2016, the entire contents of which are incorporated herein by reference.

FIELD

The embodiments discussed herein are related to an information processing method, apparatus, an information processing device, and a recording medium.

BACKGROUND

For analysis of an error that occurs in a device coupled to a network (for example, hardware failure or packet loss), information included in a communication packet in the network is used as a log.

In a certain document, a technology is discussed in which dedicated equipment is installed in a network to collect logs. However, when such a technology is utilized, it is difficult to collect logs at the timing of occurrence of an error in the device. Thus, there is a case in which an administrator of the network performs work such as reproduction environment building and reproduction test execution in order to collect logs at the occurrence of the error. However, such work takes a lot of time and effort. It is desirable for the device in the network to collect logs related to the occurred error. As related arts, for example, Japanese Laid-open Patent Publication No. 2013-206147, Japanese Laid-open Patent Publication No. 09-55797, Japanese Laid-open Patent Publication No. 10-133917, Japanese Laid-open Patent Publication No. 2010-192665, and the like, are discussed.

SUMMARY

According to an aspect of the invention, an information processing method executed by a processor included in an information processing device coupled to a network, the information processing method includes acquiring, when an error occurred at the information processing device is detected, first identification information that include identification information of a transmission source of a first packet transmitted or received when the error has occurred and identification information of a transmission destination of the first packet; receiving a second packet from the network; determining whether second identification information included in the second packet matches with the first identification information, the second identification information including identification information of a transmission source of the second packet and identification information of a transmission destination of the second packet; storing data corresponding to the second packet when it is determined that the second identification information matches with the first identification information; and transmitting, when an instruction is received from a management device that analyzes the error, the data to the management device in accordance with the instruction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of data stored in an address storage unit;

FIG. 7 is a diagram illustrating an example of data stored in a packet storage unit;

DESCRIPTION OF EMBODIMENTS

It is difficult to predict occurrence of an error. Therefore, there is a case in which error processing (for example, retry or the like) already ends, and logs are already deleted due to a limitation of the capacity of a storage device when the administrator notices the occurrence of the error. In a case in which communication is performed between devices, when silent failure (for example, a state in which one of the devices does not detect an error even when the other device detects the error) occurs, logs may not be collected.

For example, when an error occurs in communication between two devices, a terminal of the administrator accesses both of the devices first, and obtains logs and executes analysis of the logs. However, the obtained logs may not be logs at the occurrence of the error. Therefore, the administrator performs works such as reproduction environment building and reproduction test execution, and the terminal of the administrator obtains logs at that time from each of the devices and analyzes the error (for example, identification of the cause). It takes a lot of time and effort for such a series of works. The number of processes increases as the number of devices related to an error increases.

Therefore, in the embodiment, automatic collection of logs is achieved by a method described below.

Figure 1:
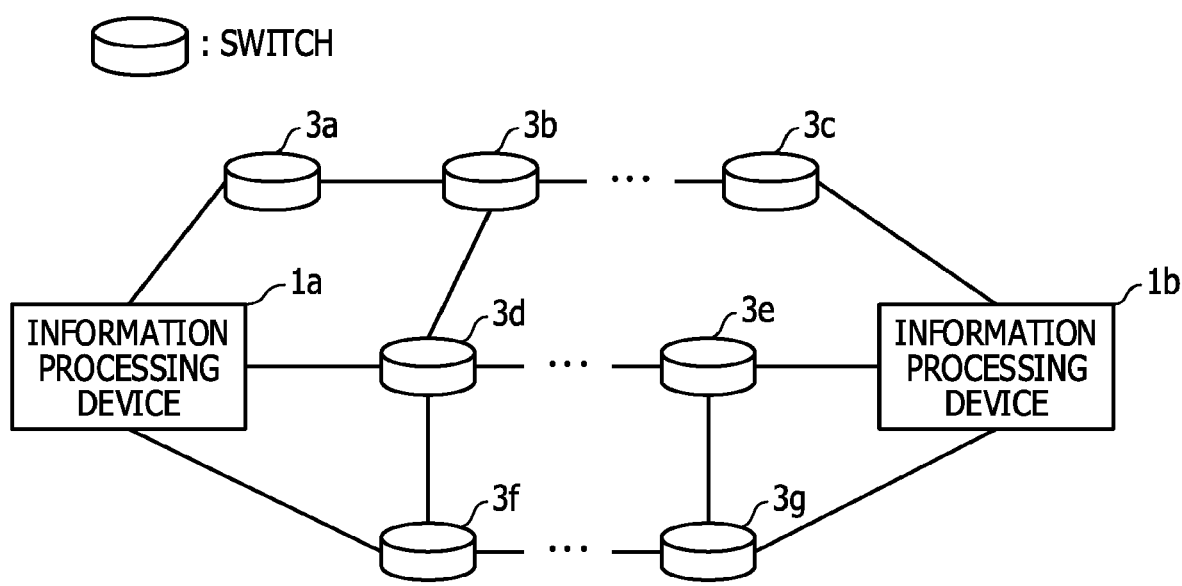
FIG. 1 is a diagram illustrating the outline of a system according to an embodiment.

FIG. 1 is a diagram illustrating the outline of a system according to the embodiment. Information processing devices 1a and 1b are, for example, physical servers. Switches 3a to 3g are, for example, local area network (LAN) switches, routers, or the like. The information processing devices 1a and 1b communicate with each other. A communication packet is relayed through the switches 3a to 3g. A plurality of communication paths exists between information processing devices 1a and 1b. In the example of FIG. 1, the number of communication paths is three. However, more communication paths may exist.

Figure 2:
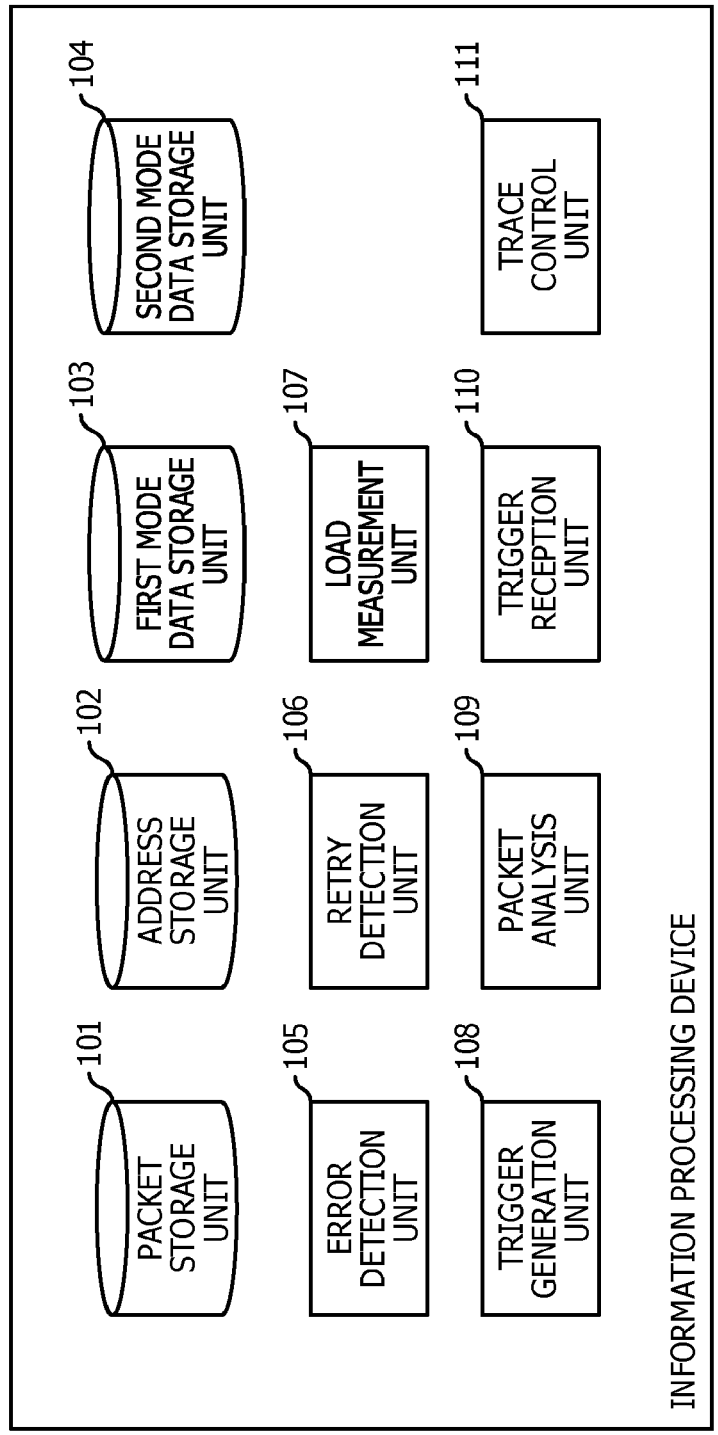
FIG. 2 is a functional block diagram of an information processing device.

FIG. 2 is a functional block diagram of each of the information processing devices 1a and 1b. Each of the information processing devices 1a and 1b includes a packet storage unit 101, an address storage unit 102, a first mode data storage unit 103, a second mode data storage unit 104, an error detection unit 105, a retry detection unit 106, a load measurement unit 107, a trigger generation unit 108, a packet analysis unit 109, a trigger reception unit 110, and a trace control unit 111. The trigger generation unit 108, the packet analysis unit 109, the trigger reception unit 110, and the trace control unit 111 correspond to, for example, processes of firmware. The error detection unit 105, the retry detection unit 106, and the load measurement unit 107 correspond to, for example, processes of a program of the upper layer of the firmware.

The error detection unit 105 detects occurrence of an error (for example, hardware error, packet loss, or the like) in the device and collects a packet that is transmitted or received at the occurrence of the error. The retry detection unit 106 monitors the status of retry for the error. The load measurement unit 107 measures a load factor of a central processing unit (CPU) of the device. The trigger generation unit 108 generates a trigger packet used to start and stop packet collection. In addition, the trigger generation unit 108 transmits the generated trigger packet to a transmission destination identified based on data stored in the first mode data storage unit 103. The packet analysis unit 109 executes processing to determine whether to collect a packet received from the network, based on the data stored in the address storage unit 102. The trigger reception unit 110 determines whether to transfer the received trigger packet, based on data stored in the second mode data storage unit 104. The trace control unit 111 executes processing to control collection of a packet.

A functional block diagram of each of the switches 3a to 3g is the same as the functional block diagram of each of the information processing devices 1a and 1b, so that the description is omitted herein.

Processing executed in the system according to the embodiment is described below with reference to FIGS. 3 to 13. First, processing executed by a device at the occurrence of an error occurred is described below with reference to FIGS. 3 to 8. It is probable that an error occurs in any one of the devices illustrated in FIG. 1. However, even when an error occurs in any one of the devices, the following processing is executed.

Figure 3:
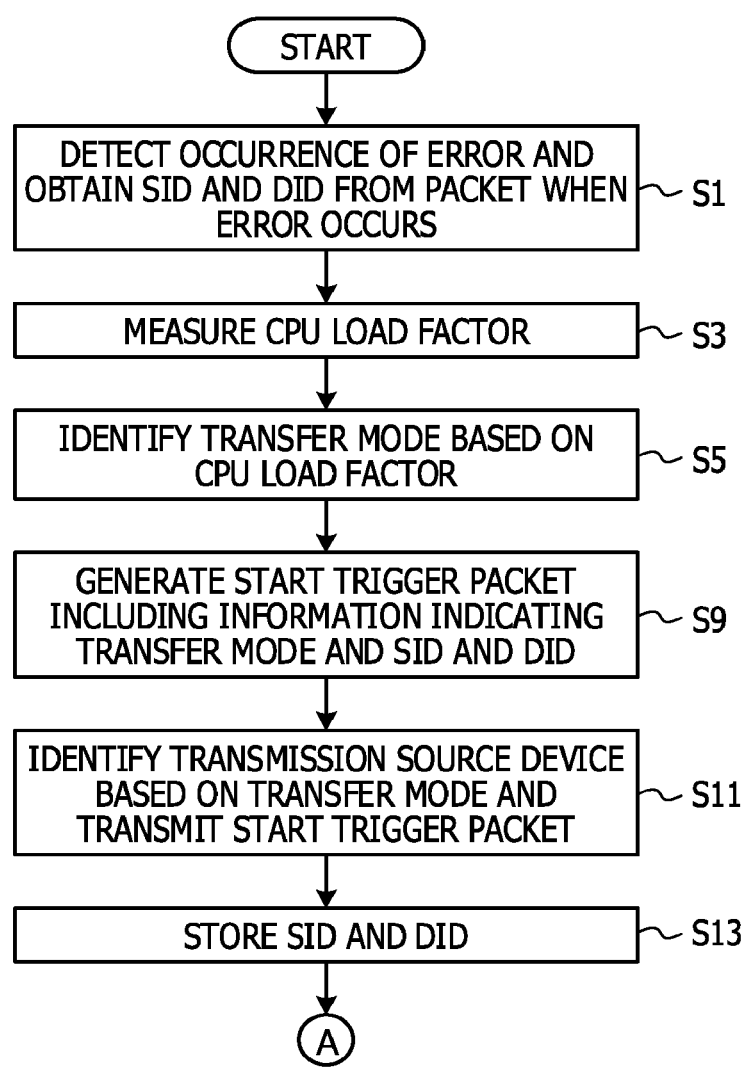
FIG. 3 is a diagram illustrating a processing flow of processing executed by a device at the occurrence of an error.

First, the error detection unit 105 detects occurrence of an error and obtains a source identifier (SID) and a destination identifier (DID) from a packet that is transmitted or received at the occurrence of the error (FIG. 3: S1). The SID is an address of a transmission source. The DID is an address of a transmission destination.

The load measurement unit 107 measures a CPU load factor of the device (S3). The load measurement unit 107 then outputs data of the CPU load factor to the trigger generation unit 108.

The trigger generation unit 108 identifies a transfer mode based on the data of the CPU load factor received from the load measurement unit 107 (S5). In addition, the trigger generation unit 108 stores information indicating the identified transfer mode in the first mode data storage unit 103.

In the embodiment, when the CPU load factor is less than a threshold value, the trigger generation unit 108 identifies the transfer mode as "normal mode". When the CPU load factor is the threshold value or more, the trigger generation unit 108 identifies the transfer mode as "eco mode". Here, "normal mode" is a mode in which a trigger packet is transferred through each of the plurality of communication paths between the transmission source and the transmission destination of the packet. On the other hand, "eco mode" is a mode in which a trigger packet is transferred through the shortest path between the transmission source and the transmission destination. In the normal mode, every packet may be collected. However, a delay may occur in communication in the network. In the eco mode, an impact on the communication in the network may be reduced. However, when transfer of a packet is performed through the shortest path, it is difficult to collect every packet related to an error.

Figure 4:
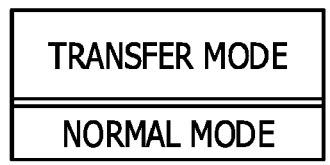
FIG. 4 is a diagram illustrating an example of data stored in a first mode data storage unit.

FIG. 4 is a diagram illustrating an example of data stored in the first mode data storage unit 103. In the example of FIG. 4, information indicating the transfer mode is stored.

The trigger generation unit 108 receives an SID and a DID of a packet that is transmitted or received at the occurrence of the error, from the error detection unit 105. In addition, the trigger generation unit 108 generates a start trigger packet that includes information indicating the transfer mode stored in the first mode data storage unit 103 and the SID and the DID, and that is used to start packet collection (S9).

The trigger generation unit 108 identifies a device that is a transmission destination of the start trigger packet, based on the transfer mode identified in S5. In addition, the trigger generation unit 108 transmits the start trigger packet generated in S9 to the device that is the transmission destination of the start trigger packet (S11). For example, in a case in which the error detection unit 105 of the information processing device 1b detects an error occurred in the information processing device 1b, when the transfer mode is the normal mode, the start trigger packet is transmitted from the information processing device 1b to the switches 3c, 3e, and 3g. On the other hand, when the transfer mode is the eco mode, the start trigger packet is transmitted merely to a switch on the shortest path from the information processing device 1b (for example, the switch 3e). The shortest path is calculated by a certain calculation algorithm.

The trigger generation unit 108 stores the SID and the DID received from the error detection unit 105 in the address storage unit 102 (S13). The flow proceeds to processing of S17 of FIG. 6 through the terminal A illustrated in FIG. 3, and packet collection starts.

Figure 5:
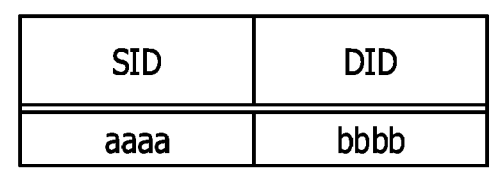

FIG. 5 is a diagram illustrating an example of data stored in the address storage unit 102. In the example of FIG. 5, an SID and a DID are stored in the address storage unit 102.

Figure 6:
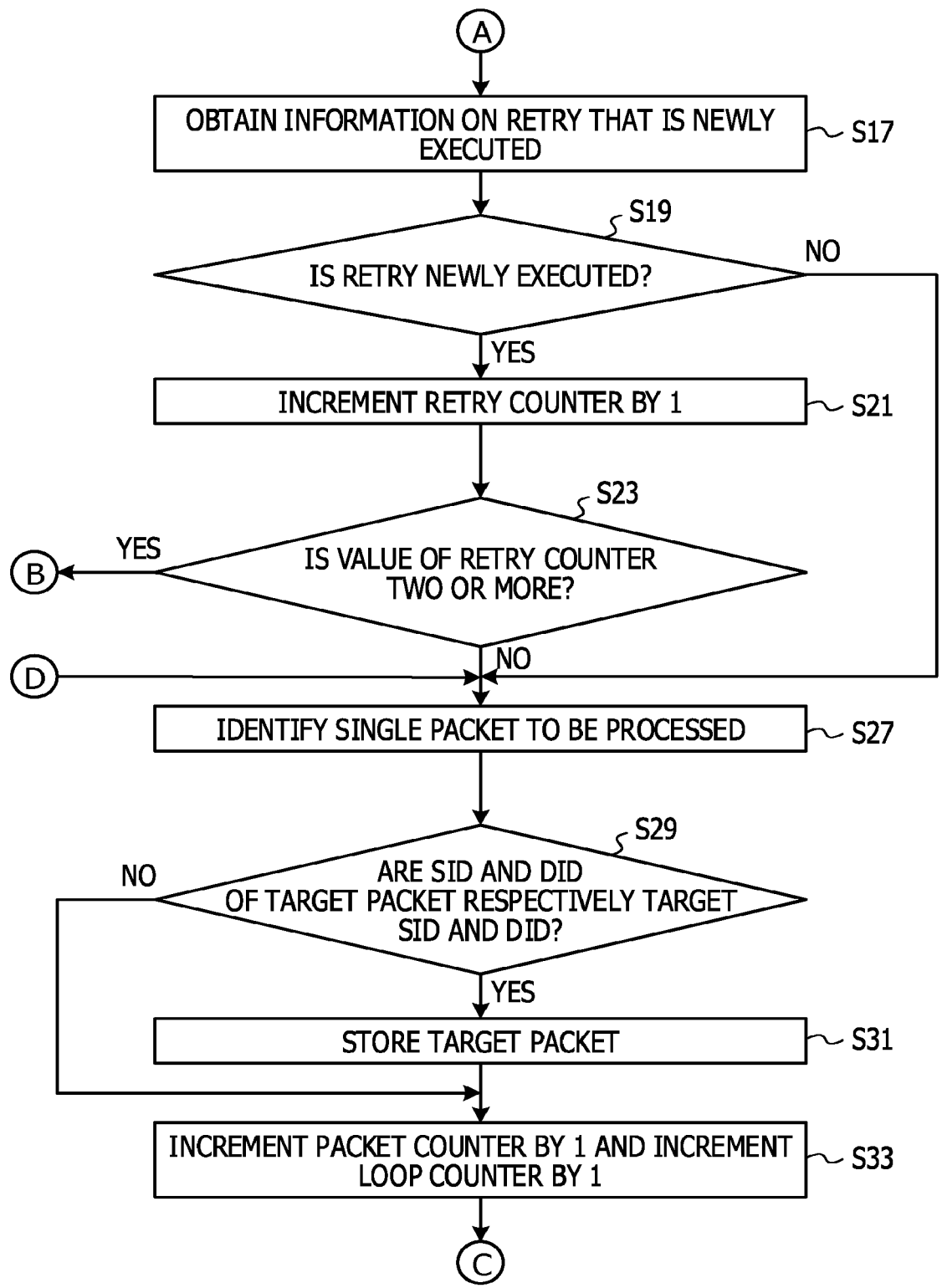
FIG. 6 is a diagram illustrating a processing flow of the processing executed by the device at the occurrence of an error.

Next, in FIG. 6, the trace control unit 111 obtains information on retry newly executed from the retry detection unit 106 (FIG. 6: S17). For example, when retry is newly executed after the processing of S17 is executed previously, the trace control unit 111 obtains information indicating that the retry is newly executed.

The trace control unit 111 determines whether retry is newly executed (S19). When retry is not newly executed (S19: No route), the flow proceeds to processing of S27. When retry is newly executed (S19: Yes route), the trace control unit 111 increments a retry counter by 1 (S21). The initial value of the retry counter is 1. The retry counter is used to suppress delay of another piece of processing due to frequent execution of retry.

The trace control unit 111 determines whether the value of the retry counter is two or more (S23). When the value of the retry counter is two or more (S23: Yes route), the packet analysis unit 109 ends the processing of the packet. The flow then proceeds to processing of S41 of FIG. 8 through the terminal B illustrated in FIG. 6. When the value of the retry counter is less than two (S23: No route), the packet analysis unit 109 identifies a single packet to be processed (for example, a packet to be transmitted or a received packet) (S27).

The packet analysis unit 109 determines whether an SID and a DID of the packet identified in S27 (hereinafter referred to as a target packet) are respectively matched with the SID and the DID stored in the address storage unit 102 (S29). That is, the packet analysis unit 109 determines whether the transmission source and the transmission destination of the packet transmitted or received at the occurrence of the error are respectively matched with the transmission source and the transmission destination of the target packet.

When the SID and the DID of the target packet are not respectively matched with the SID and the DID stored in the address storage unit 102 (S29: No route), the flow proceeds to processing of S33. On the other hand, when the SID and the DID of the target packet are respectively matched with the SID and the DID stored in the address storage unit 102 (S29: Yes route), the packet analysis unit 109 stores the target packet in the packet storage unit 101 (S31). In the packet storage unit 101, a copy of the target packet is stored.

Figure 7:
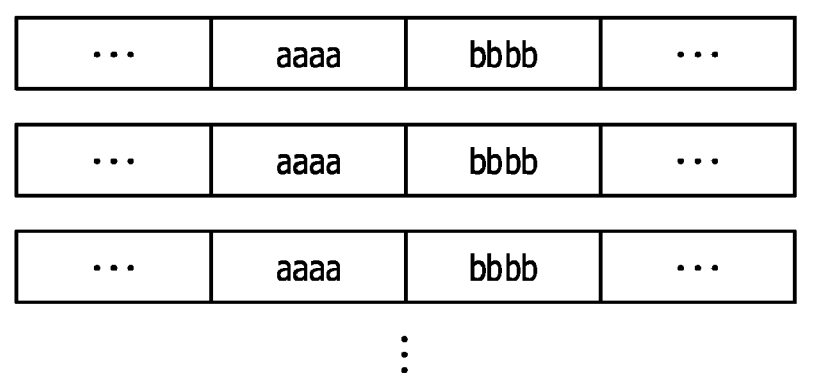

FIG. 7 is a diagram illustrating an example of data stored in the packet storage unit 101. In the example of FIG. 7, packets having the identical SID and DID are stored. Therefore, packets to be stored are limited, so that a usage of a storage device such as a memory may be saved.

The trace control unit 111 increments a packet counter by 1, and increments a loop counter by 1 (S33). The flow proceeds to processing of S35 of FIG. 8 through the terminal C illustrated in FIG. 6. The packet counter is used to avoid delay of another piece of processing due to frequent execution of retry. The loop counter is used to avoid occurrence of an endless loop for an error in which retry is not executed.

Figure 8:
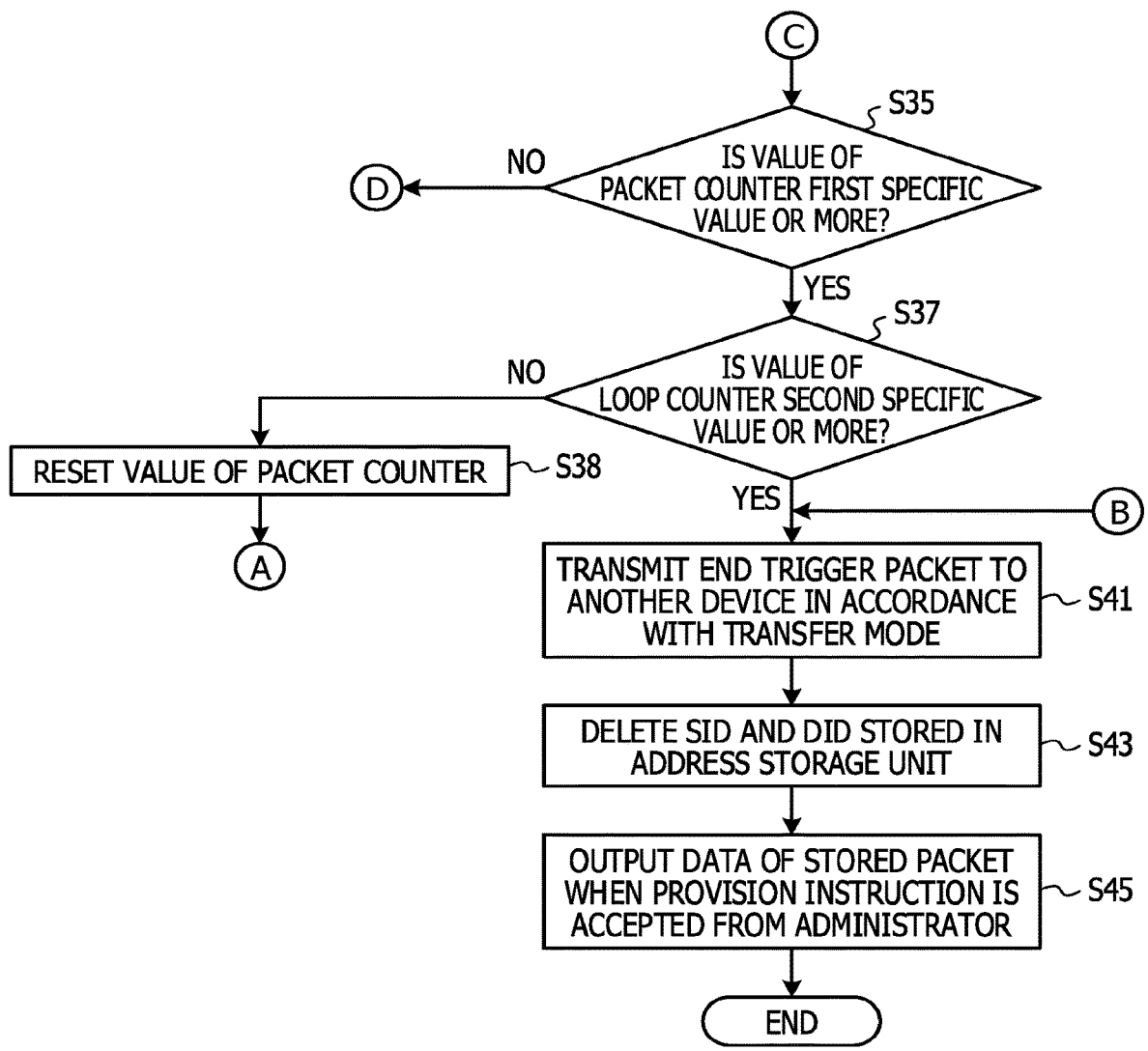
FIG. 8 is a diagram illustrating a processing flow of the processing executed by the device at the occurrence of an error.

Next, in FIG. 8, the trace control unit 111 determines whether the value of the packet counter is a first specific value or more (FIG. 8: S35). The first specific value is set by the administrator in advance.

When the value of the packet counter is less than the first specific value (S35: No route), the processing of the packet is continued, so that the flow proceeds to the processing of S27 of FIG. 6 through the terminal D illustrated in FIG. 8.

On the other hand, when the value of the packet counter is the first specific value or more (S35: Yes route), the trace control unit 111 determines whether the value of the loop counter is a second specific value or more (S37). The second specific value is set by the administrator in advance.

When the value of the loop counter is less than the second specific value (S37: No route), the trace control unit 111 resets the value of the packet counter (for example, sets the value at 0) (S38). The flow then proceeds to the processing of S17 of FIG. 6 through the terminal A illustrated in FIG. 8.

On the other hand, when the value of the loop counter is the second specific value or more (S37: Yes route), the packet analysis unit 109 ends the processing of the packet. The trigger generation unit 108 then generates an end trigger packet to end the packet collection. In addition, the trigger generation unit 108 transmits the generated end trigger packet to the device that is the transmission destination of the start trigger packet (S41).

The trace control unit 111 deletes the SID and the DID stored in the address storage unit 102 (S43).

After that, when the trace control unit 111 accepts a provision instruction of data of the packet stored in the packet storage unit 101 from the administrator, the trace control unit 111 outputs the data (S45). For example, the trace control unit 111 transmits the packet data to the terminal of the administrator or displays the packet data on a display device. Then the processing ends.

When the above-described processing is executed, a start trigger packet is transmitted from a device at the detection of an error to each device related to the error, so that, even in each of the related devices, a packet may be automatically collected. A packet at the occurrence of the error may be stored.

Processing executed by a device after receiving a start trigger packet is described below with reference to FIGS. 9 to 12.

Figure 9:
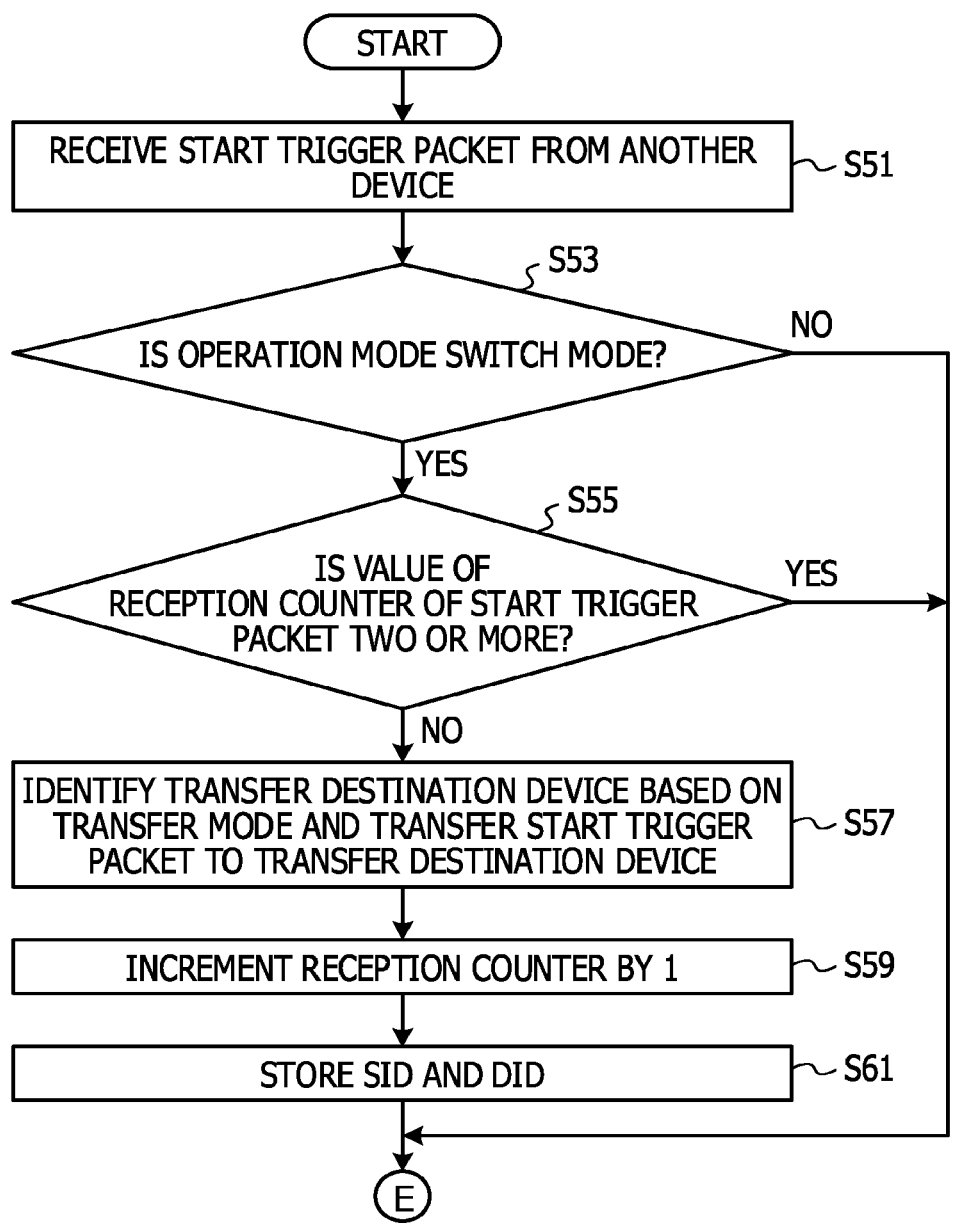
FIG. 9 is a diagram illustrating a processing flow of processing executed by a device after receiving a start trigger packet.

First, the trigger reception unit 110 of a certain device in the network receives a start trigger packet from another device (FIG. 9: S51).

The trigger reception unit 110 determines whether the operation mode is "switch mode", based on information that indicates the operation mode and is stored in the second mode data storage unit 104 (S53). In the embodiment, there is "switch mode" or "device mode" as the operation mode. Here, "switch mode" is a mode in a case in which the device is a switch. In addition, "device mode" is a mode in a case in which the device is an information processing device.

Figure 10:
FIG. 10 is a diagram illustrating an example of data stored in a second mode data storage unit.

FIG. 10 is a diagram illustrating an example of data stored in the second mode data storage unit 104. In the example of FIG. 10, information indicating the operation mode is stored in the second mode data storage unit 104. The information indicating the operation mode is stored in advance before the processing in the embodiment starts.

When the operation mode is not "switch mode" (S53: No route), the device after receiving the start trigger packet is not a switch (that is, the device after receiving the start trigger packet does not include a relay function), so that transfer of the start trigger packet is not performed. Thus, the flow proceeds to S65 of FIG. 11 through the terminal E illustrated in FIG. 9.

When the operation mode is "switch mode" (S53: Yes route), it is determined whether the value of the reception counter of the start trigger packet is two or more (S55). The initial value of the reception counter of the start trigger packet is 1.

When the value of the reception counter of the start trigger packet is two or more (S55: Yes route), transfer of the start trigger packet is already performed, so that the flow proceeds to S65 of FIG. 11 through the terminal E.

When the value of the reception counter of the start trigger packet is less than 2 (S55: No route), the trigger generation unit 108 receives the information indicating the transfer mode and the SID and the DID that are included in the start trigger packet, from the trigger reception unit 110. In addition, the trigger generation unit 108 identifies a device that is a transfer destination of the start trigger packet, based on the transfer mode. In addition, the trigger generation unit 108 transfers the start trigger packet to the device that is the transfer destination (S57). As described above, "normal mode" is a mode in which a trigger packet is transferred through each of a plurality of communication paths between the packet transmission source and the packet transmission destination. In addition, "eco mode" is a mode in which a trigger packet is transferred through the shortest path between the transmission source and the transmission destination. For example, when the device receiving the start trigger packet is a switch on the shortest path, and the transfer mode is the eco mode, the start trigger packet is transmitted to the next device on the shortest path. For example, when the device receiving the start trigger packet is a switch on the shortest path, and is also a switch on a path other than the shortest path, and the transfer mode is the normal mode, the start trigger packet is transferred to the next device on the shortest path and the next device on the path other than the shortest path. For example, when the device receiving the start trigger packet is a switch on a path other than the shortest path, and the transfer mode is the normal mode, the start trigger packet is transferred to the next switch on the path other than the shortest path.

The trigger generation unit 108 increments the reception counter of the start trigger packet by 1 (S59).

The trigger reception unit 110 stores the SID and the DID included in the start trigger packet, in the address storage unit 102 (S61). The flow proceeds to S65 of FIG. 11 through the terminal E.

Figure 11:
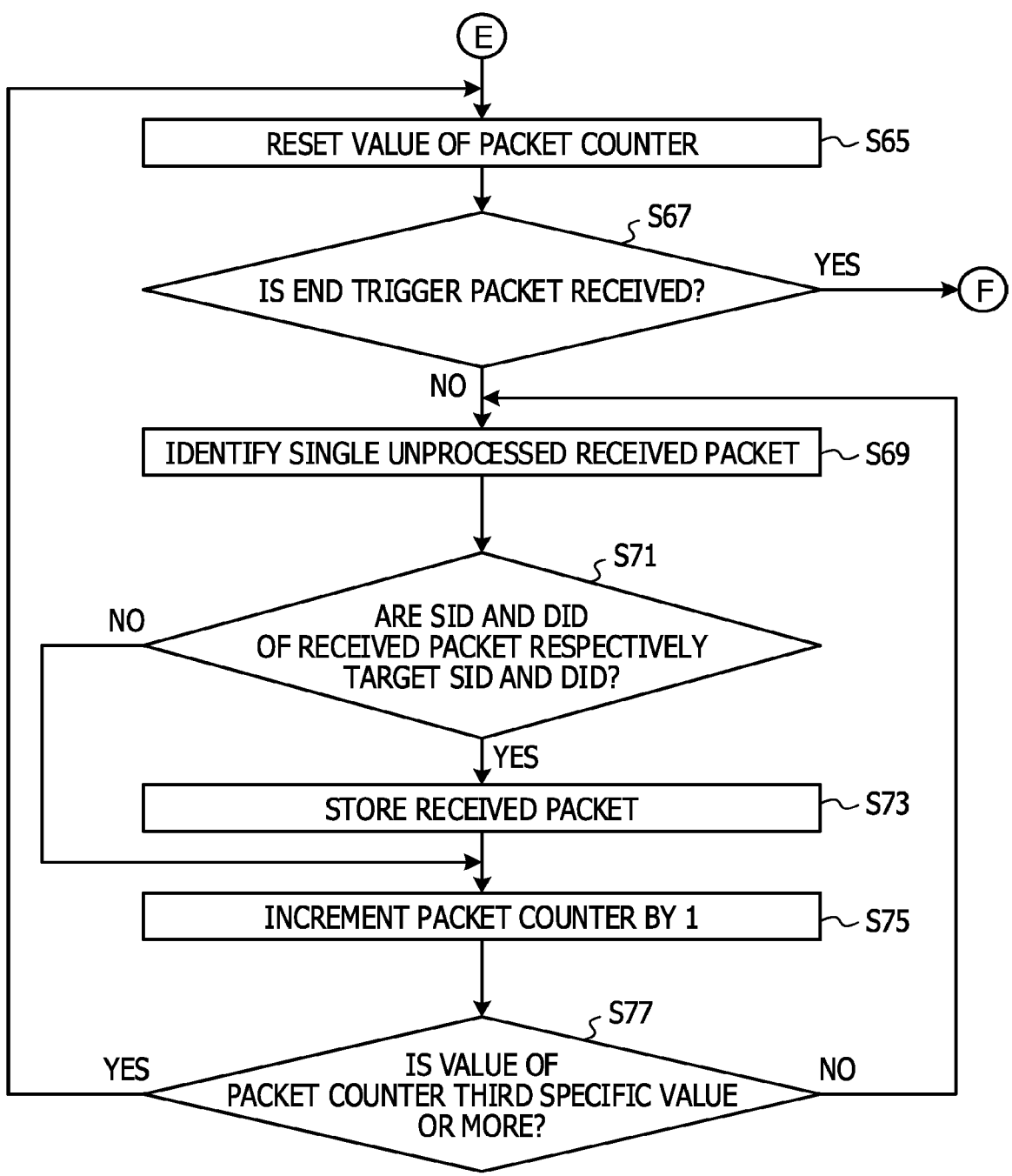
FIG. 11 is a diagram illustrating a processing flow of the processing executed by the device after receiving the start trigger packet.

Next, in FIG. 11, the trace control unit 111 resets the value of the packet counter (for example, sets the value at 0) (FIG. 11: S65).

The trace control unit 111 receives a response to an inquiry whether an end trigger packet is already received from the trigger reception unit 110, and then determines whether the end trigger packet is already received (S67).

When an end trigger packet is not received (S67: No route), the packet analysis unit 109 identifies a single unprocessed packet from packets received from the network (S69).

The packet analysis unit 109 determines whether an SID and a DID of the packet identified in S69 (hereinafter referred to as a received packet) are respectively matched with the SID and the DID stored in the address storage unit 102 (S71).

When the SID and the DID of the received packet are not respectively matched with the SID and the DID stored in the address storage unit 102 (S71: No route), the flow proceeds to processing of S75. On the other hand, when the SID and the DID of the received packet are respectively matched with the SID and the DID stored in the address storage unit 102 (S71: Yes route), the packet analysis unit 109 stores the received packet in the packet storage unit 101 (S73). As described above, a stored packet is limited, so that the usage of a storage device such as a memory may be saved. In S73, a copy of the received packet is stored in the packet storage unit 101.

The trace control unit 111 increments the packet counter by 1 (S75), and determines whether the value of the packet counter is a third specific value or more (S77). When the value of the packet counter is less than the third specific value (S77: No route), the flow returns to the processing of S69. On the other hand, when the value of the packet counter is the third specific value or more (S77: Yes route), the flow returns to the processing of S65. The third specific value is set in advance by the administrator.

On the other hand, when an end trigger packet is received (S67: Yes route), the flow proceeds to processing of S81 of FIG. 12 through the terminal F illustrated in FIG. 11.

Figure 12:
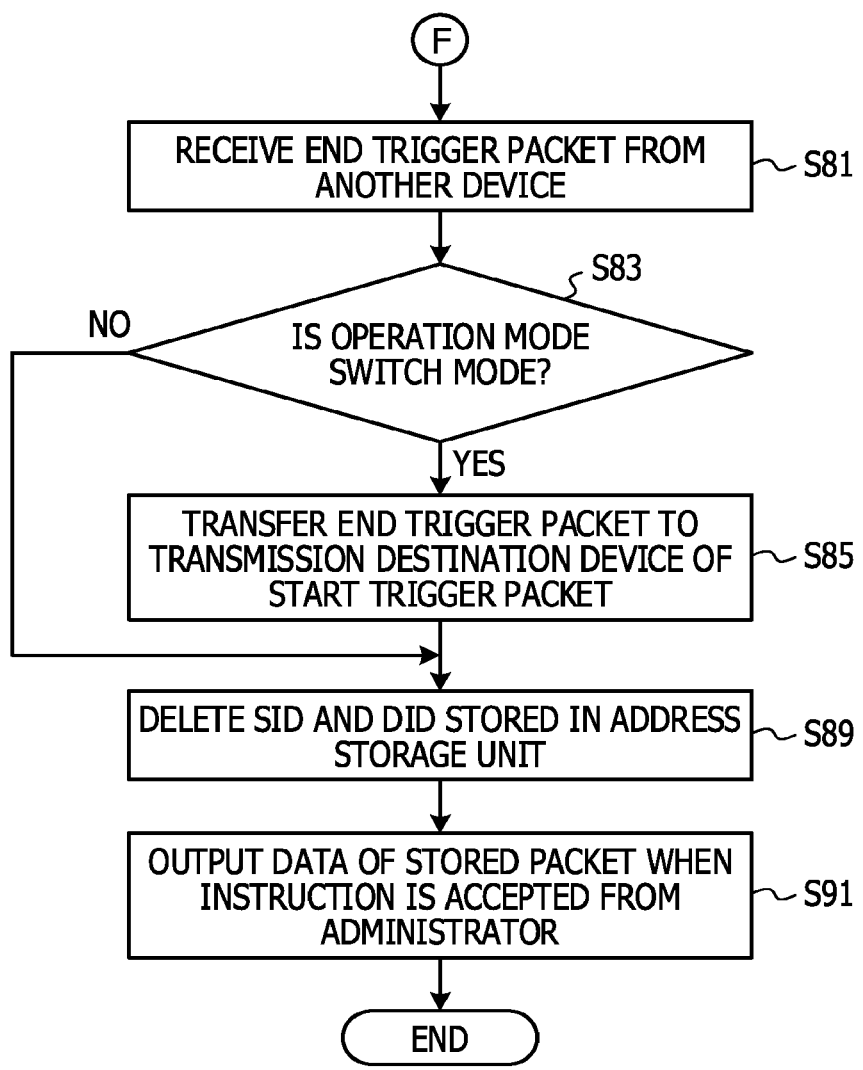
FIG. 12 is a diagram illustrating a processing flow of the processing executed by the device after receiving the start trigger packet.

Next, in FIG. 12, the trigger reception unit 110 receives an end trigger packet from another device (FIG. 12: S81).

The trigger reception unit 110 determines whether the operation mode is "switch mode", based on the information that indicates the operation mode and is stored in the second mode data storage unit 104 (S83). In the embodiment, there is "switch mode" or "device mode" as the operation mode. Here, "switch mode" is mode when the device is a switch. In addition, "device mode" is mode when the device is an information processing device.

When the operation mode is not "switch mode" (S83: No route), the device after receiving the end trigger packet is not a switch (that is, the device after receiving the end trigger packet does not include a relay function), so that the transfer of the end trigger packet is not performed. Thus, the flow proceeds to processing of S89.

When the operation mode is "switch mode" (S83: Yes route), the end trigger packet is transferred to the device that is the transfer destination of the start trigger packet (S85).

The trace control unit 111 deletes the SID and the DID stored in the address storage unit 102 (S89).

After that, the trace control unit 111 outputs data of the packet stored in the packet storage unit 101 when the trace control unit 111 accepts a provision instruction of the data from the administrator (S91). For example, the trace control unit 111 transmits the packet data to the terminal of the administrator. In addition, the processing ends.

When the above-described processing is executed, a packet may be collected in each device on the path of the packet.

Figure 13:
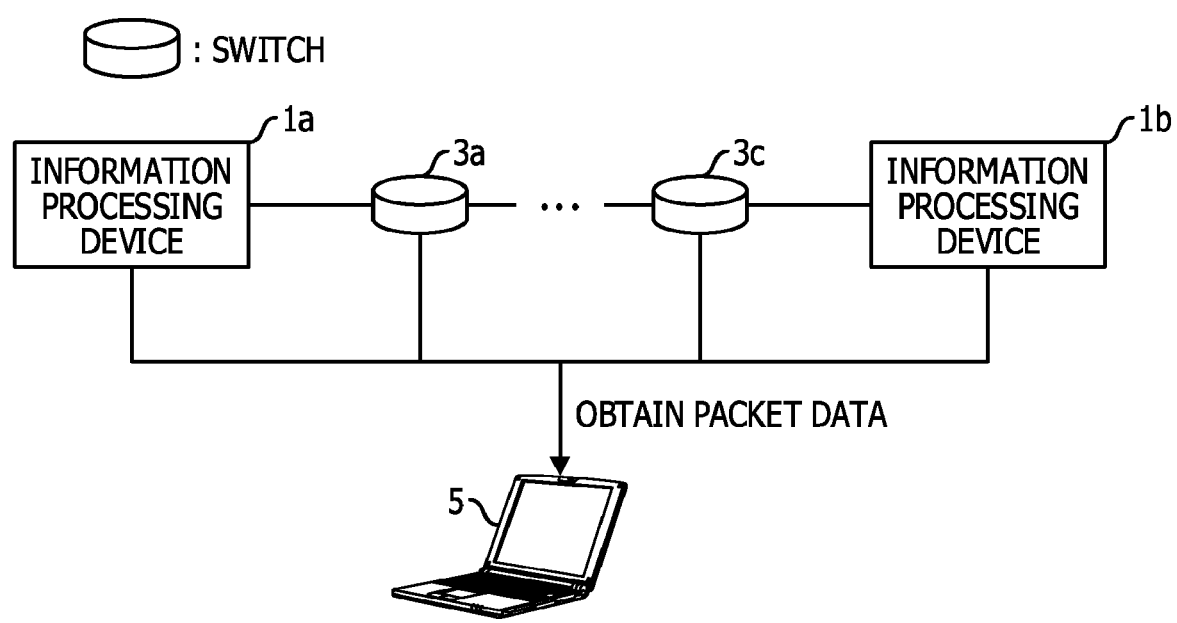
FIG. 13 is a diagram illustrating provision of data of a collected packet.

Provision of data of a collected packet is described below with reference to FIG. 13. In the example of FIG. 13, an error occurs in a case the information processing device 1*a* and the information processing device 1*b* communicate with each other, and packets are stored in devices on the shortest path due to the eco mode. The devices on the shortest path correspond to the information processing device 1*a*, the switches 3*a* to 3*c*, and the information processing device 1*b*. In this case, in the terminal 5 of the administrator, an error may be analyzed when data of a packet stored in the packet storage unit 101 is received from each of the devices on the shortest path.

In the embodiment, works such as reproduction environment building and reproduction test execution become unnecessary. A packet at the occurrence of the error is stored, so that a work for identifying an occurrence location of the error also becomes unnecessary.

The embodiments of the technology discussed herein are described above, but the embodiment is not limited to such an example. For example, the above-described function block configurations of the information processing devices 1*a* and 1*b*, and the switches 3*a* to 3*g* may not be respectively matched with the actual program module configurations.

The above-described data storage configuration is an example, and the embodiment is not limited to the above-described configuration. In addition, even in the processing flow, the order of the pieces of processing may be changed unless the processing result does not change. In addition, the pieces of processing may be executed in parallel.

The transfer mode may be set through specification by the user.

A method in which collection of packets is continued during a certain time period may be employed.

In the embodiment, packets are collected while retry is performed once, but packets may be collected while more retries are performed.

Figure 14:
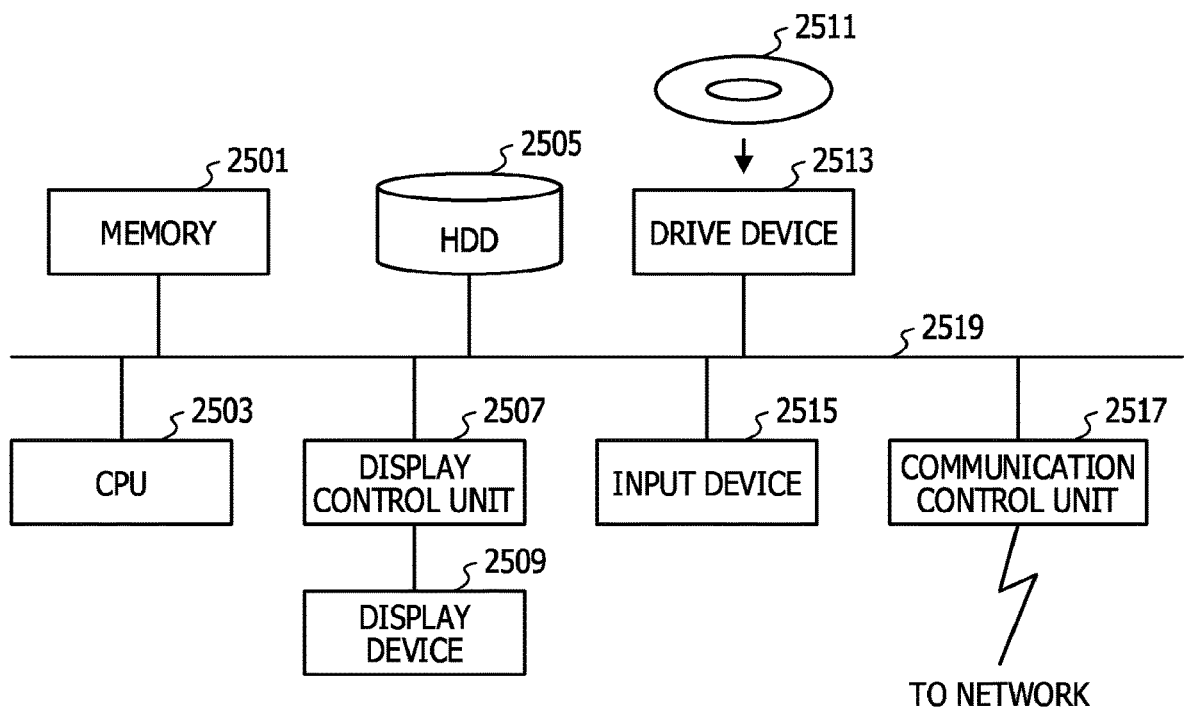
FIG. 14 is a functional block diagram of a computer.

Each of the above-described information processing devices 1a and 1b is a computer device. As illustrated in FIG. 14, a memory 2501, a central processing unit (CPU) 2503, a hard disk drive (HDD) 2505, a display control unit 2507 coupled to a display device 2509, a drive device 2513 for a removable disk 2511, an input device 2515, and a communication control unit 2517 used for connection with a network are coupled to each other through a bus 2519. An operating system (OS) and an application program used to execute the processing in the embodiment are stored in the HDD 2505. The application program is read from the HDD 2505 to the memory 2501 when being executed by the CPU 2503. The CPU 2503 controls the display control unit 2507, the communication control unit 2517, and the drive device 2513 in accordance with the processing content of the application program to perform certain operations. Data in the middle of the processing is typically stored in the memory 2501. However, the data may be stored in the HDD 2505. In the embodiments of the technology discussed herein, the application program used to execute the above-described processing is stored in a computer-readable removable disk 2511 and distributed, and is installed from the drive device 2513 onto the HDD 2505. The application program may be installed onto the HDD 2505 through the network such as the Internet and the communication control unit 2517. Such a computer device achieves the above-described various functions when the above-described hardware such as the CPU 2503 and the memory 2501 and the program such as the OS and the application program are organically operated in cooperation.

Figure 15:
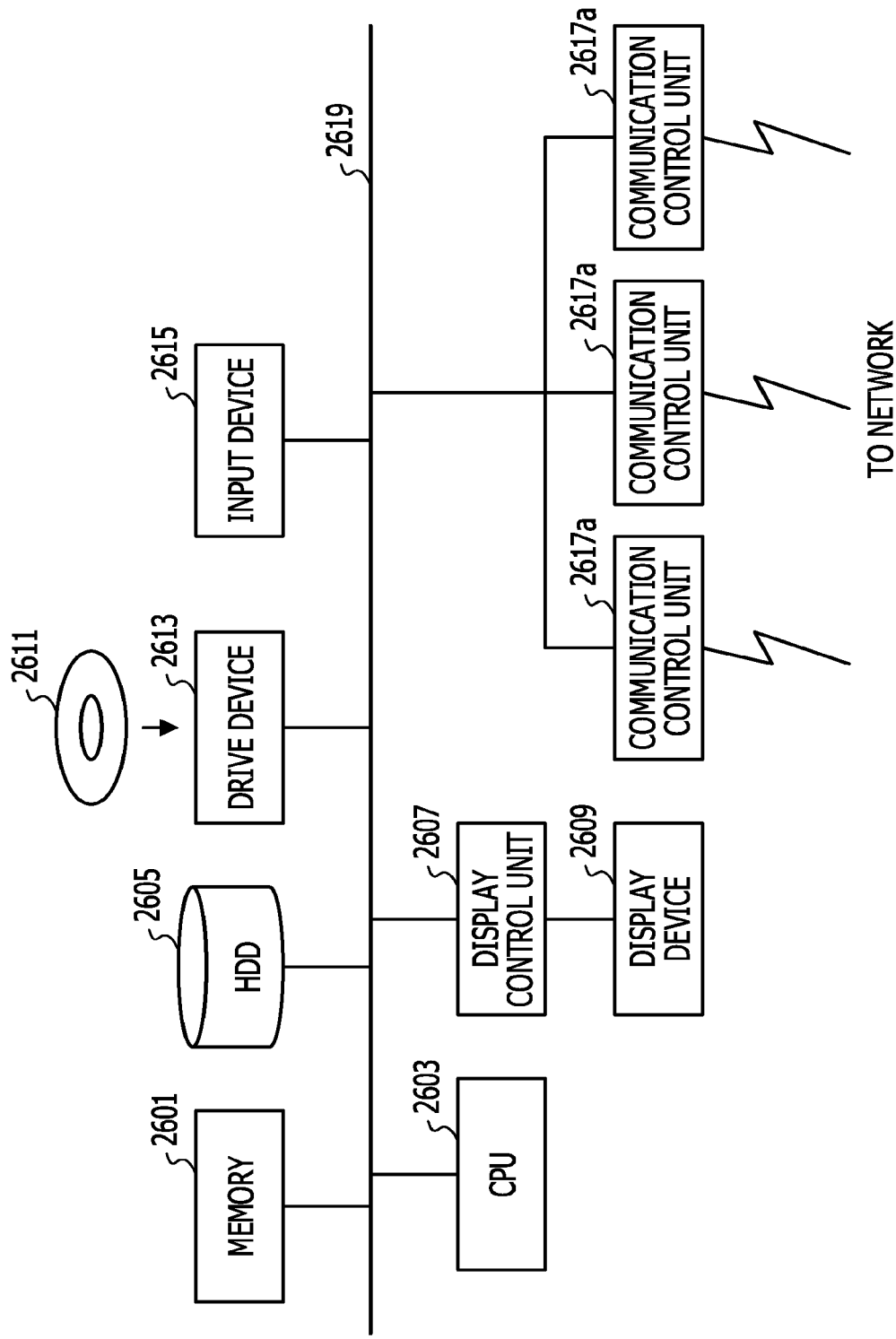
FIG. 15 is a functional block diagram of a computer including a relay function.

As illustrated in FIG. 15, each of the above-described switches 3a to 3g is a computer device including a relay function. The switch may have a configuration in which a memory 2601, a CPU 2603, a HDD 2605, a display control unit 2607 coupled to a display device 2609, a drive device 2613 for a removable disk 2611, an input device 2615, and communication control units 2617 (2617a to 2617c in FIG. 15) each of which is used for connection with the network are coupled to each other through a bus 2619. In some case, the display control unit 2607, the display device 2609, the drive device 2613, and the input device 2615 are not included in the switch. An OS and an application program used to execute the processing in the embodiment are stored in the HDD 2605. The application program is read from the HDD 2605 to the memory 2601 when being executed by the CPU 2603. The CPU 2603 controls the display control unit 2607, the communication control unit 2617, and the drive device 2613 to perform desired operations as appropriate. Data input through one of the communication control units 2617 is output through another communication control unit 2617. The CPU 2603 controls the communication control unit 2617 to switch the output destination appropriately. Data in the middle of processing is stored in the memory 2601 and stored in the HDD 2605 as appropriate. In the embodiments of the technology discussed herein, the application program used to execute the above-described processing is stored in a computer-readable removable disk 2611 and distributed, and installed from the drive device 2613 onto the HDD 2605. The application program may be installed onto the HDD 2605 through a network such as the Internet and the communication control unit 2617. Such a computer device achieves the above-described various functions when the above-described hardware such as the CPU 2603 and the memory 2601, and the OS and the desired application program are organically operated in cooperation.

The above described embodiments of the technology discussed herein are summarized as follows.

An information processing device according to a first embodiment of the technology discussed herein includes (A) an obtaining unit that obtains identification information of a transmission source and identification information of a transmission destination of a first packet transmitted or received at occurrence of an error when the occurrence of the error is detected, and (B) a first determination unit that determines whether identification information of a transmission source and identification information of a transmission destination of a second packet received from a network are respectively matched with the identification information of the transmission source and the identification information of the transmission destination of the first packet, and stores the second packet in a storage device when the identification information of the transmission source and the identification information of the transmission destination of the second packet are respectively matched with the identification information of the transmission source and the identification information of the transmission destination of the first packet.

As a result, a packet at the occurrence of the error may be collected without works such as reproduction environment building and reproduction test conduction.

The information processing device may further include (C) a determining unit that determine a path through which the identification information of the transmission source and the identification information of the transmission destination of the first packet, and information indicating a transfer mode identified based on a processing load of the information processing device are transmitted, based on the processing load.

When the processing load is high, it is probable that communication having high load is performed, so that it is probable that the communication is delayed due to execution of packet collection. Therefore, when the above-described processing is executed, an impact on communication in the network due to the packet collection may be suppressed.

The determining unit may (c1) transmit the identification information of the transmission source and the identification information of the transmission destination of the first packet and the information of the transfer mode through the shortest path from among a plurality of paths between the transmission source and the transmission destination of the first packet when the value of the processing load of the information processing device is a specific value or more, and (c2) transmit the identification information of the transmission source and the identification information of the transmission destination of the first packet and the information indicating the transfer mode to each of the plurality of paths when the value of the processing load of the information processing device is less than the specific value.

Packet collection is performed appropriately while an impact on communication in the network is suppressed.

The information processing device may further include (D) a counting unit that counts the number of retries for the error. In addition, the first determination unit may (b1) end the execution of the determination when the number of retries counted by the counting unit reaches a certain number of times or more or when the number of second packets received from the network exceeds a certain number.

It is avoided that collection of packets is continued.

The determination unit may (c3) transmit, to another device, a first request used to request end of the execution of the determination when the number of retries counted by the counting unit reaches the certain number of times or when the number of second packets received from the network exceeds the certain number.

It is avoided that collection of packets is continued even in another device.

The information processing device may further include (E) a second determination unit that determines whether the information processing device includes a relay function when identification information of a transmission source and identification information of a transmission destination of a third packet transmitted or received at the occurrence of the error is received. In addition, the determining unit may (c4) transfer the identification information of the transmission source and the identification information of the transmission destination of the third packet, to a device coupled to the information processing device when the second determination unit determines that the information processing device includes a relay function.

For example, it is conceived that a device such as a switch or a router is not located at the end of a transmission path of the third packet. Thus, when the above-described processing is executed, each device on the transmission path of the third packet may receive the identification information of the transmission source and the identification information of the transmission destination of the third packet.

An information processing method according to a second embodiment of the technology discussed herein includes processing of (F) obtaining, when occurrence of an error is detected, identification information of a transmission source and identification information of a transmission destination of a first packet transmitted or received at the occurrence of the error, (G) determining whether identification information of a transmission source and identification information of a transmission destination of a second packet received from a network are respectively matched with the identification information of the transmission source and the identification information of the transmission destination of the first packet, and (H) storing the second packet in a storage device when it has been determined that the identification information of the transmission source and the identification information of the transmission destination of the second packet are respectively matched with the identification information of the transmission source and the identification information of the transmission destination of the first packet.

An information processing system according to a third embodiment of the technology discussed herein includes (I) a first information processing device and (J) a second information processing device. In addition, the first information processing device includes (i1) an obtaining unit that obtains identification information of a transmission source and identification information of a transmission destination of a first packet transmitted or received at occurrence of an error and when the information processing device has detected the occurrence of the error, (i2) a first determination unit that determines whether identification information of a transmission source and identification information of a transmission destination of a second packet received from a network are respectively matched with the identification information of the transmission source and the identification information of the transmission destination of the first packet, and stores the second packet in a first storage device when the identification information of the transmission source and the identification information of the transmission destination of the second packet are respectively matched with the identification information of the transmission source and the identification information of the transmission destination of the first packet, and (i3) a transmission unit that transmits the identification information of the transmission source and the identification information of the transmission destination of the first packet to the second information processing device. In addition, the second information processing device includes (j1) a reception unit that receives the identification information of the transmission source and the identification information of the transmission destination of the first packet from the first information processing device and (j2) a second determination unit that determines whether identification information of a transmission source and identification information of a transmission destination of a third packet received from the network are respectively matched with the identification information of the transmission source and the identification information of the transmission destination of the first packet, and stores the third packet in a second storage device when the identification information of the transmission source and the identification information of the transmission destination of the third packet are respectively matched with the identification information of the transmission source and the identification information of the transmission destination of the first packet.

A program used to cause a processor to execute the processing by the above-described method may be created, and the program is stored, for example, in a computer-readable storage medium or storage device such as a flexible disk, a compact disc-read-only memory (CD-ROM), a magneto optical disk, a semiconductor memory, or a hard disk. An intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing method executed by a processor included in an information processing device coupled to a network, the information processing method comprising:

when an error occurred at the information processing device is detected, acquiring, from a first packet transmitted or received by the information processing device when the error has occurred, first identification information that include identification information of a transmission source of the first packet and identification information of a transmission destination of the first packet;

generating a start trigger packet for collecting a packet corresponding to the first identification information, the start trigger packet being used to start packet collection;

transmitting the generated start trigger packet to one or more communication paths between the transmission source of the first packet and the transmission destination of the first packet;

receiving a second packet from a device arranged on one of the one or more communication paths;
determining whether second identification information included in the second packet matches with the first identification information, the second identification information including identification information of a transmission source of the second packet and identification information of a transmission destination of the second packet;
storing data corresponding to the second packet when it is determined that the second identification information matches with the first identification information;
counting a number of retries of transmission processing executed when the error occurs;
generating an end trigger packet to end the packet collection when the counted number of retries is greater than a first threshold or when a number of second packets received from the network exceeds a second threshold;
transmitting the generated end trigger packet to the one or more communication paths; and
transmitting, when an instruction is received from a management device that analyzes the error, the data to the management device in accordance with the instruction.

2. The information processing method according to claim 1, further comprising:
measuring a processing load of the information processing device when the error is detected;
identifying a transfer mode indicating a transmission method of the start trigger packet based on the processing load;
specifying a transmission destination of the start trigger packet from among a plurality of devices arranged between the transmission source of the first packet and the transmission destination of the first packet; and
transmitting the start trigger packet to the specified transmission destination.

3. The information processing method according to claim 2, wherein the identifying the transfer mode includes:
determining whether the processing load is less than a threshold;
specifying a first transmission mode indicating transmission of the start trigger packet to each of the one or more communication paths as the transfer mode when it is determined that the processing load is less than the threshold; and
specifying a second transmission mode indicating transmission of the start trigger packet to the one of the one or more of communication paths as the transfer mode when it is determined that the processing load is not less than a threshold.

4. The information processing method according to claim 2, wherein the one of the plurality of communication paths is a shortest path between the transmission source of the first packet and the transmission destination of the first packet.

5. The information processing method according to claim 1, wherein
the determining ends when the counted number of retries is greater than the first threshold or when the number of second packets received from the network exceeds the second threshold.

6. The information processing method according to claim 2, wherein the data is a copy packet of the second packet.

7. An information processing device coupled to a network, the information processing device comprising:
a memory; and
a processor coupled to the memory and configured to:
when an error occurred at the information processing device is detected, acquire, from a first packet transmitted or received by the information processing device when the error has occurred, first identification information that include identification information of a transmission source of the first packet and identification information of a transmission destination of the first packet;
generate a start trigger packet for collecting a packet corresponding to the first identification information, the start trigger packet being used to start packet collection;
transmit the generated start trigger packet to one or more communication paths between the transmission source of the first packet and the transmission destination of the first packet;
receive a second packet from a device arranged on one of the one or more communication paths;
determine whether second identification information included in the second packet matches with the first identification information, the second identification information including identification information of a transmission source of the second packet and identification information of a transmission destination of the second packet;
store data corresponding to the second packet when it is determined that the second identification information matches with the first identification information;
count a number of retries of transmission processing executed when the error occurs;
generate an end trigger packet to end the packet collection when the counted number of retries is greater than a first threshold or when a number of second packets received from the network exceeds a second threshold;
transmit the generated end trigger packet to the one or more communication paths; and
transmit, when an instruction is received from a management device that analyzes the error, the data to the management device in accordance with the instruction.

8. The information processing device according to claim 7, wherein the processor is configured to:
measure a processing load of the information processing device when the error is detected;
determine at least one communication path used to transmit the first identification information to another device in the network, based on the processing load; and
transmit the first identification information to the another device through the determined at least one communication path.

9. The information processing device according to claim 8, wherein the processor is configured to:
transmit, when the processing load is less than a threshold value, the first identification information and information on a first transmission mode to the another device through each of the one or more communication paths between the information processing device and the another device, the information on the first transmission mode indicating transmitting through each of the plurality of communication paths; and
transmit, when the processing load is the threshold value or more, the first identification information and information on a second transmission mode to the another device through the one of the one or more communication paths, the information on the second transmission mode indicating transmitting through the one of the plurality of communication paths.

10. The information processing device according to claim 9, wherein
the information processing device is coupled to another device, and
the another device is configured to:
determine, when the first identification information is received by the another device, whether the another device is a switch by referring to operation mode information, the operation mode information being stored in the another device, the operation mode information indicating whether the another device is a switch; and
transfer the first identification information to a device coupled to the another device when it is determined that the another device is a switch.

11. A non-transitory computer-readable recording medium storing a program that causes a processor included in an information processing device to execute a process, the process comprising:
when an error occurred at the information processing device is detected, acquiring, from a first packet transmitted or received by the information processing device when the error has occurred, first identification information that include identification information of a transmission source of the first packet and identification information of a transmission destination of the first packet;
generating a start trigger packet for collecting a packet corresponding to the first identification information, the start trigger packet being used to start packet collection;
transmitting the generated start trigger packet to one or more communication paths between the transmission source of the first packet and the transmission destination of the first packet;
receiving a second packet from a device arranged on one of the one or more communication paths;
determining whether second identification information included in the second packet matches with the first identification information, the second identification information including identification information of a transmission source of the second packet and identification information of a transmission destination of the second packet;
storing data corresponding to the second packet when it is determined that the second identification information matches with the first identification information;
counting a number of retries of transmission processing executed when the error occurs;
generating an end trigger packet to end the packet collection when the counted number of retries is greater than a first threshold or when a number of second packets received from the network exceeds a second threshold;
transmitting the generated end trigger packet to the one or more communication paths; and
transmitting, when an instruction is received from a management device that analyzes the error, the data to the management device in accordance with the instruction.

* * * * *